United States Patent [19]

Kole et al.

[11] 4,128,699

[45] Dec. 5, 1978

[54] TREATED GYPSUM WALLBOARD PAPER

[75] Inventors: Donald R. Kole, Cheektowaga; Donald A. Kossuth, Buffalo, both of N.Y.

[73] Assignee: National Gypsum Company, Dallas, Tex.

[21] Appl. No.: 838,478

[22] Filed: Oct. 3, 1977

[51] Int. Cl.² ............... B32B 13/08; B32B 29/00
[52] U.S. Cl. ........................ 428/498; 156/44; 162/179; 427/403; 427/417; 428/539
[58] Field of Search ........... 156/39, 44, 45; 428/70, 428/76, 318, 480, 481, 497, 498, 499, 538, 539; 427/243, 403, 417; 162/179

[56] References Cited

U.S. PATENT DOCUMENTS

| | | | |
|---|---|---|---|
| 2,721,504 | 10/1955 | Mossberg et al. | 162/179 |
| 3,383,271 | 5/1968 | Roberts et al. | 428/498 |
| 3,535,155 | 10/1970 | Gathman | 162/179 |
| 3,694,298 | 9/1972 | Veschuroff et al. | 428/70 |

Primary Examiner—William J. Van Balen
Attorney, Agent, or Firm—Robert F. Hause

[57] ABSTRACT

Drying oils are used to improve strength and durability characteristics of gypsum wallboard paper with many unexpected additional advantages. Applied before board manufacture, critical porosity characteristics are left uninterrupted. Applied after board manufacture, shear strengths are obtained beyond expectations.

10 Claims, 2 Drawing Figures

TREATED GYPSUM WALLBOARD PAPER

This invention relates to treated gypsum board paper, and particularly to the treatment of such paper with a drying oil such as an advanced polymeric alkyd modified drying oil, normally in a solvent such as a petroleum distillate, or as a water emulsion.

Gypsum wallboard is manufactured by preparing a slurry of calcined gypsum and other additives with an excess of water, forming this slurry into board form within an envelope of wallboard paper, and allowing the gypsum to harden while supported in board form. A great excess of water must then be removed, in a high temperature dryer, this moisture coming out of the gypsum core by passing through the pores of the paper. In order for the moisture to be able to pass through the paper at an acceptable rate, in present day high speed plants, it is essential that the paper has a porosity value of about 300 seconds or lower, as determined on a Gurley densometer, using TAPPI Standards T460 M-49 test procedure.

It has long been recognized that it can be advantageous to improve the properties of the paper surface of a gypsum wallboard, but that treatment of the paper surface before formation into a board generally causes manufacturing problems. Applications of coatings to the paper surface have been known to affect the passage of moisture through the paper during drying of the board. This problem is discussed in U.S. Pat. No. 3,694,298.

The present invention involves treating the fibers of the wallboard paper with a drying oil, particularly a resin modified drying oil, improving the characteristics of the paper very significantly and not materially reducing the porosity of the paper.

It is an object of the present invention to provide an improved coating for gypsum wallboard paper.

It is a further object of the invention to provide a method of making an improved paper for use in gypsum wallboard manufacture.

It is a still further object of the invention to provide an improved method of making gypsum wallboard with protective coatings thereon.

The above and other objects and advantages of the invention will be more readily apparent when considered in relation to the preferred embodiments, as set forth in the specification and shown in the drawing in which.

Figure 1:
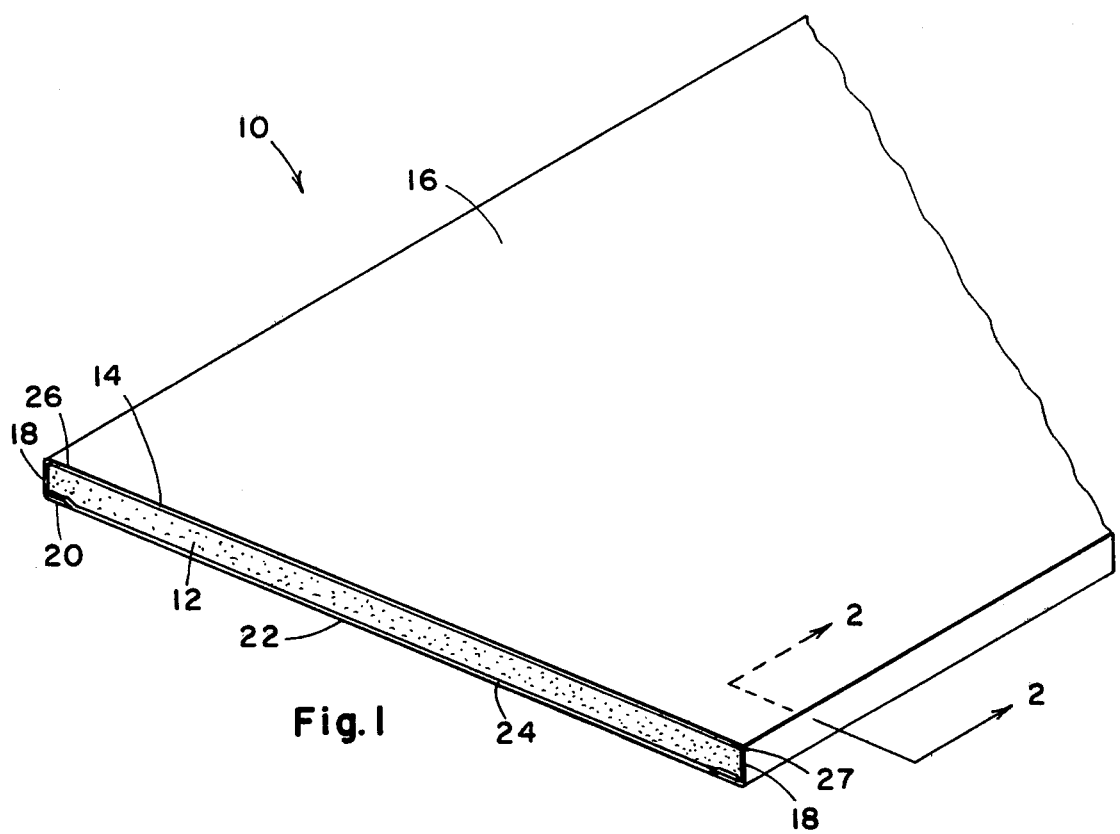
FIG. 1 is an isometric view of a gypsum wallboard embodying the present invention.

Referring to FIG. 1, there is shown a gypsum wallboard 10 having a set gypsum core 12, a front face paper 14 extending throughout the front face 16, the side edges 18, 18 and onto the edge portions 20, 20 of the back face 22 of wallboard 10, and a back face paper 24 extending substantially throughout the back face 22 of wallboard 10.

Figure 2:
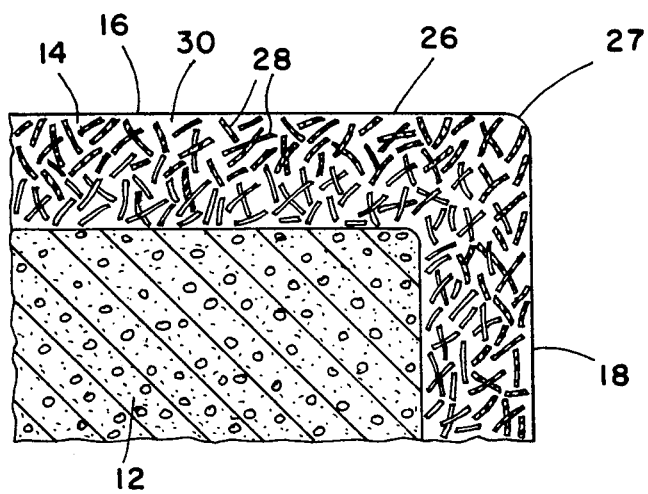
FIG. 2 is a cross-sectional view of the wallboard of FIG. 1 taken on line 2—2.

Referring to FIG. 2, an enlarged cross-sectional view is shown of front edge portion 26 at front face 16 showing a small portion of gypsum core 12, with front face paper 14 disposed around the front edge corner 27.

The front face paper 14 has a thickness of about 0.5 mm, and consists of a vast plurality of cellulose fibers 28. Substantially all of the fibers within the top 10 to 90% of the thickness extending downward from the outer surface 30 are individually impregnated with a cured drying oil, whereby the fibers are converted essentially into plastic elements, as shown diagrammatically in FIG. 2.

Drying oils are a known class of chemicals, which includes, for example, chia oil, fish oil, hempseed oil, linseed oil, oiticica oil, perilla oil, poppyseed oil, safflower oil, soybean oil, sunflower oil, tung oil and walnut oil. In the preferred form of these drying oils, a major portion of the saturated fatty acids are removed therefrom, leaving a more reactive form of the particular drying oil used. p The drying oil solution used in the invention will preferably be a combination of two or more drying oils, and will also preferably be modified by being combined and partially prereacted with a resin, such as an alkyd or a phenol resin.

A suitable alkyd modified drying oil solution can be formed by combining 3 parts of tung oil and 3 parts of chia oil with 2 parts of a partially pre-polymerized alkyd resin, in the presence of 2 parts of mineral spirits solvent. These ingredients are all liquids at room temperature, however a solvent or thinner, which will evaporate off, has been found essential in the proper impregnation of the paper. An emulsion of drying oils in water has been formed to provide proper impregnation of the paper.

Linseed oil is also one of the preferred drying oils to be used, preferably in combination with other drying oils, in making the alkyd modified drying oil solution. These preferred drying oils will be understood to consist, at least in part, of oleic, linoleic, linolenic and/or eleostearic unsaturated fatty acids.

The above described resin modified drying oil solution is applied to the outer surface 30 of a front face paper 14, definitely before being used in the manufacture of gypsum wallboard therefrom, and preferably immediately after completion of the manfacture of the paper and prior to the paper being rolled into large rolls for shipment to the gypsum board manufacturing facility. The solution can be applied by several suitable methods including roll coating, spraying, calender box, flooding and wiping.

A marked improvement in the surface abrasion resistance, tensile strength, water repellency, printing ink acceptance, shear resistance and mullen burst strength is obtained with solution applications of about 5–15 kg per thousand square meters, with typical wallboard papers of about 0.5 mm thickness and weighing 165 kg per thousand square meters. These characteristics start to show some improvement with loadings of as little as about 1 kg/MSM.

Maximum loadings in coating the plain paper to be used in making gypsum board will, of course, vary with the character of the paper. With the above-mentioned 0.5 mm, 165 kg weight paper, loadings substantially greater than about 15 kg/MSM will impregnate the paper to a depth greater than desired and have an undesirable effect on the ability of the paper to develop wet bond and dry bond to the gypsum core material of the gypsum wallboard. Impregnation can extend to deeper than 50% of the paper thickness, but the deeper the impregnation, the greater the chance for isolated areas being impregnated to closely adjacent the opposite paper surface whereby bond problems may result when bonding the paper to the gypsum core material. Thus, what is important is that the drying oils impregnate cellulose fibers to a depth sufficient to develop significant paper surface characteristics on the outer surface without going so deep that gypsum core bond problems develop at the paper to core interface.

The alkyd modified drying oil solution can be varied in its viscosity by varying the proportion of solvent, in order to obtain the depth of penetration desired with the loading rate desired. Viscosities of from about 100 to about 1000 centipoises have been found to provide satisfactory saturation of the paper fibers. These low viscosities will be recognized as of a nature that produce wetting of the individual fibers without substantial bridging between fibers, whereby the paper porosity is not substantially affected.

The above discussions of loading rates applies to plain paper to be subsequently used in making gypsum board. There is substantially no maximum loading other than as limited by economics when applying the novel coatings to a wallboard paper after the manufacture of the wallboard.

A commercially available resin modified drying oil solution that can be used in accordance with the invention is a sealer varnish sold by Glidden Coatings and Resin Division of SCM Corporation, which is an advanced polymeric alkyd modified drying oil with 15% mineral spirits solvent, sold as product number 870-C-14-101.

After the resin modified drying oils have been applied to the paper, the drying oils undergo reactions, including oxidation, which reactions cause the impregnant solution to cure and harden on and within the cellulose fibers with still substantially no bridging of the type that tends to reduce the porosity of the paper.

Having completed a detailed disclosure of the preferred embodiments of our invention so that those skilled in the art may practice the same, we contemplate that variations may be made without departing from the essence of the invention or the scope of the appended claims.

We claim:

1. The method of making an improved porous paper comprising the steps of mixing a drying oil and a thinner for decreasing the viscosity, impregnating the paper with said mixture, drying off the thinner portion of said mixture and curing said drying oil to form a porous paper formed of substantially unchanged fibrous form with said fibers being individually covered and impregnated with said cured drying oil.

2. The method of claim 1 wherein said drying oil is further modified by the addition of a resin thereto.

3. The method of claim 1 wherein said mixture is an emulsion of drying oil in water.

4. The method of making paper-covered gypsum wallboard comprising the steps of making an improved porous paper as defined in claim 1, disposing an aqueous slurry of settable gypsum into a board form between two paper cover sheets at least one of which is said improved porous paper, allowing said settable gypsum to form a set gypsum core and drying said set gypsum board at temperatures causing the excess water in said core to pass through both of said paper cover sheets.

5. The method of claim 4 wherein said drying oil is further modified by the addition of a resin thereto.

6. The method of claim 5 wherein said resin is an alkyd.

7. An improved gypsum wallboard porous paper having cellulose fibers substantially all of which to a depth of at least about 10% of the thickness of the paper are impregnated with a drying oil.

8. Paper as defined in claim 7 having a porosity which is substantially unaffected by the presence of said drying oil.

9. Gypsum wallboard comprising a set gypsum core disposed between a face paper and a back paper, at least one of said papers having a structure as defined in claim 7.

10. Gypsum wallboard as defined in claim 9 wherein said drying oil is modified by a resin.

* * * * *